Figures 5, 6:
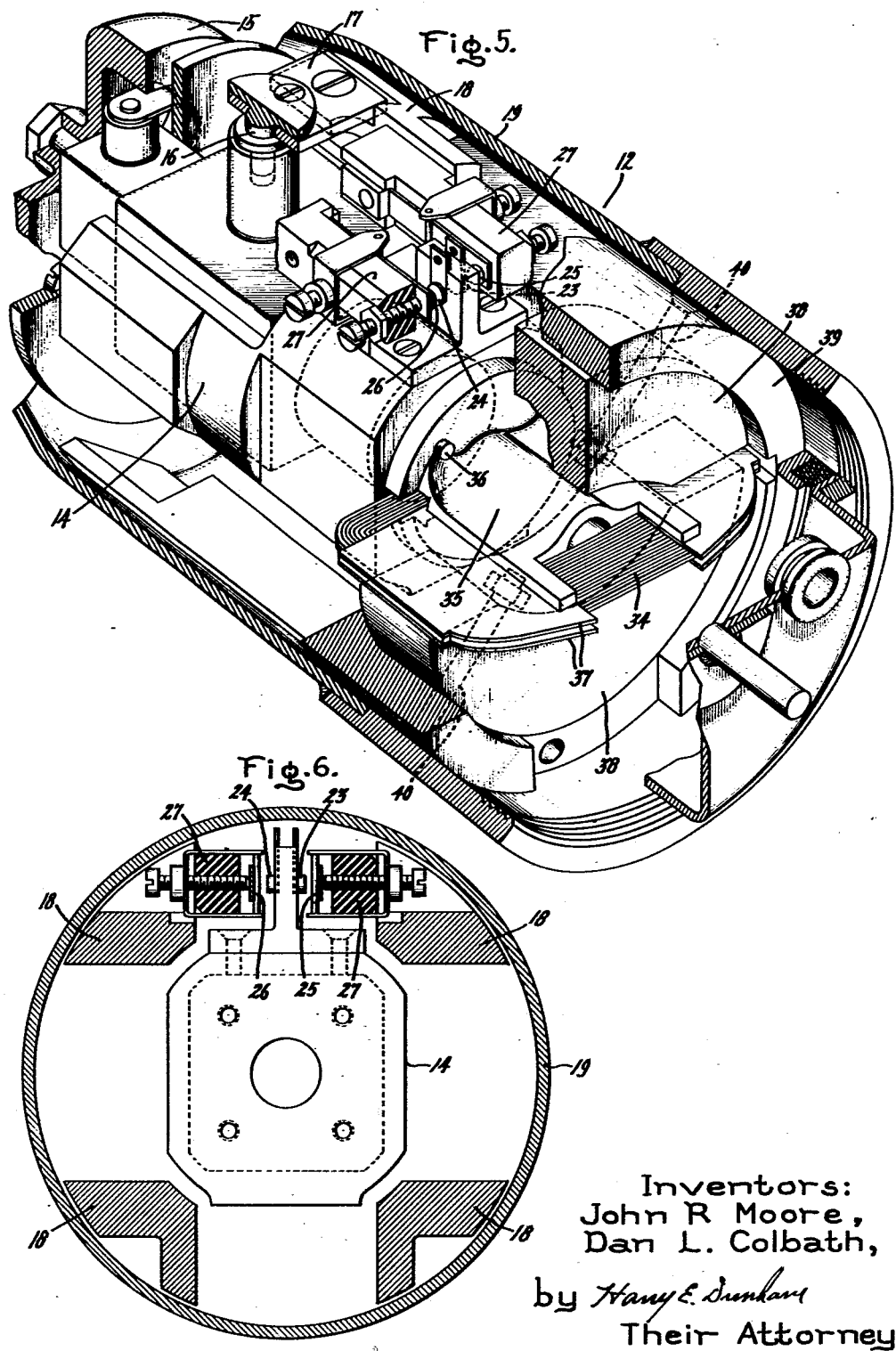

May 4, 1948.    J. R. MOORE ET AL    2,440,968
GYROSCOPIC COMPUTER FOR DETERMINING GUN SIGHT DEFLECTION
Filed Feb. 3, 1945    2 Sheets-Sheet 1
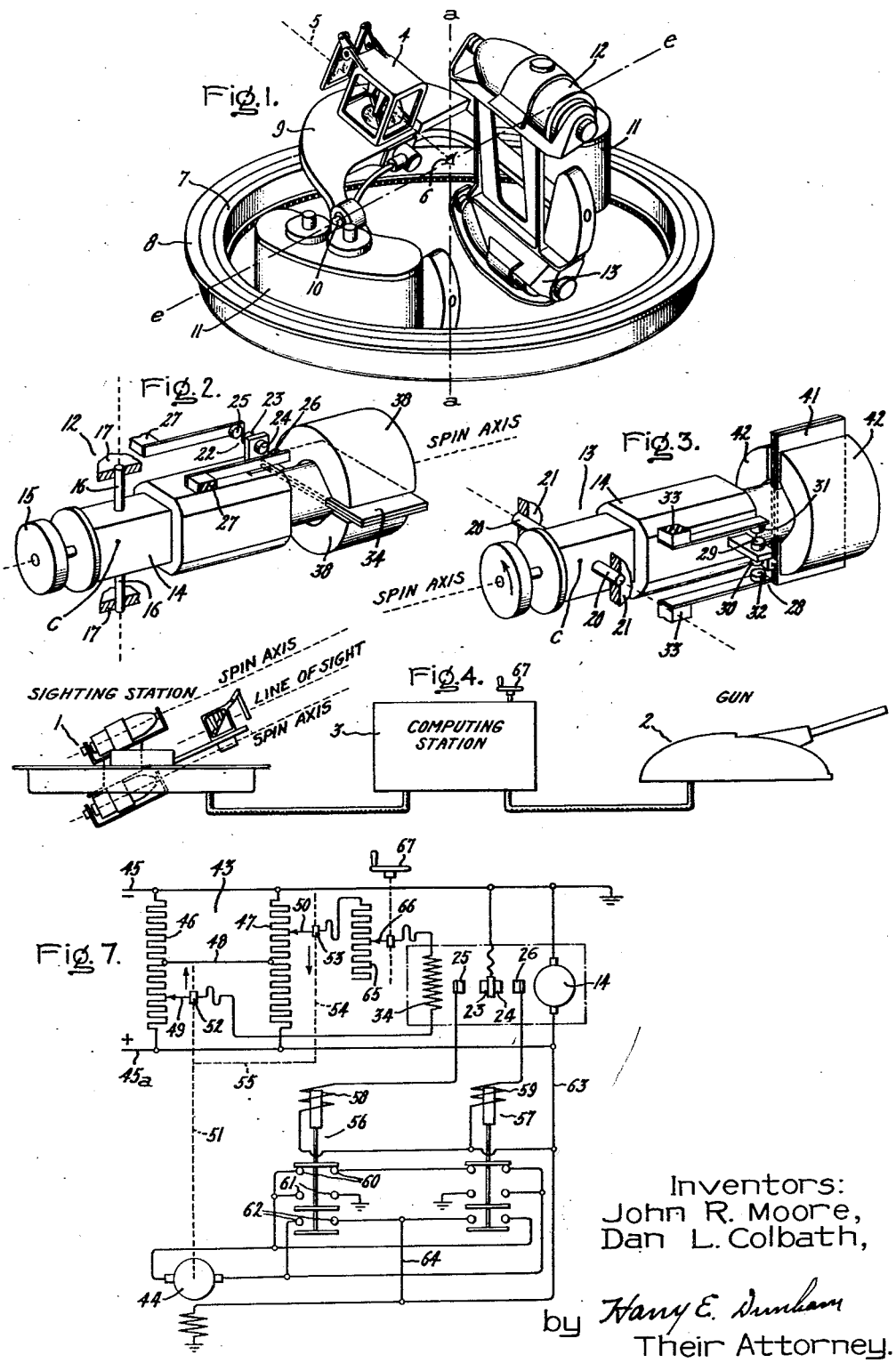
Inventors:
John R. Moore,
Dan L. Colbath,
by Harry E. Dunham
Their Attorney.

May 4, 1948. J. R. MOORE ET AL 2,440,968
GYROSCOPIC COMPUTER FOR DETERMINING GUN SIGHT DEFLECTION
Filed Feb. 3, 1945 2 Sheets-Sheet 2

Inventors:
John R Moore,
Dan L. Colbath,
by *Harry E. Dunham*
Their Attorney.

Patented May 4, 1948

2,440,968

UNITED STATES PATENT OFFICE 2,440,968

GYROSCOPIC COMPUTER FOR DETERMINING GUN SIGHT DEFLECTION

John R. Moore and Dan L. Colbath, Schenectady, N. Y., assignors to General Electric Company, a corporation of New York Application February 3, 1945, Serial No. 576,000

10 Claims. (Cl. 235—61.5)

This invention relates to a gyroscopic computer, more particularly to such a device for use in the control of gun fire, and it has for its object an improved device of this character.

More particularly, this invention contemplates improvements in the gyroscopic computer described and claimed in the copending application of Frithiof V. Johnson, Serial No. 459,780, filed September 26, 1942, and which is assigned to the assignee of the present application. As there described, the Johnson computer is particularly useful in determining the "lead" correction in the line of fire of a gun as it is related to the direction line to a target, for example the line of sight to the target, in order to compensate for the relative velocity of the target with reference to the gun mount, thereby to anticipate the movement of the target during the time of flight of the projectile fired at the target.

And also as described in the above Johnson application, the Johnson computer comprises means for establishing the direction line to the target; and a gyroscope connected to this means in a rigid system so that the direction line is maintained in predetermined relation to the spin axis of the gyroscope, for example in parallel relation with it, and also is controlled by the position of the gyroscope. The Johnson gyroscope and direction line means are mounted on a common support which is moved so as to cause the direction line to track a target. The gyroscope is coupled to the support by a coupling means constructed and arranged to apply a precessing torque to the gyroscope, which torque is proportional to the magnitude of the displacement between the gyroscope and the support, and which tends to precess the gyroscope to restore it to the original neutral or null position with reference to the support, which position it occupies when there is zero lead. When the support is moving to track a target, the gyroscope will be displaced with reference to the support and will displace the direction line by an amount dependent upon the speed of the support, that is of the target, and also upon the strength of the coupling between the gyroscope and the support, the displacement of the gyroscope being a measure of the angular velocity of the target; and when the coupling strength is adjusted in accordance with the projectile's time of flight, this displacement measures the lead correction.

In accordance with this invention, the support is conected to the gyroscope so that when the support is angularly moved to track the target a precessing torque is applied to the gyroscope by the support, which torque precesses the gyroscope from its null position. Means are provided for detecting this precession of the gyroscope. And current responsive coupling means between the gyroscope and support is controlled by this detecting means to apply a counterbalancing torque to return the gyroscope to its null position. Also means are provided for measuring the restoring torque required to restore the gyroscope to the null position; this measured restoring torque is a measure of the angular velocity of the target.

In one specific embodiment of this invention, the coupling comprises a current carrying coil linked by the flux of a magnetic field. The coil may be mounted upon the gyroscope, while the magnetic field will be attached to the support and therefore, in effect, to the direction line. When the gyroscope precesses from the null position due to the application of a precessing torque to it by its support as the support is moved to track a target, current is supplied to the coil, the magnitude and direction of the current supplied being such as to cause the coil and magnet to apply a restoring torque to the gyroscope, the magnitude and direction of which is such that it returns the gyroscope to its null position. The restoring current then remains constant until a subsequent change in the angular velocity of the support occurs, and it is a measure of the angular velocity of the direction line of sight to the target. Means are provided for measuring this current so as to measure the angular velocity of the target.

In addition, means are provided for compensating the magnitude of the voltage producing the current in accordance with the time of flight of a projectile to the target so that a measure of the actual required lead angle is obtained.

For a more complete understanding of this invention, reference should be had to the accompanying drawings in which Fig. 1 is a perspective view illustrating a gun control sighting station having a pair of lead computing gyroscopic elements arranged in accordance with this invention—one of the elements for computing the lateral component of lead and the other for computing the vertical component of lead; Fig. 2 is a schematic view illustrating the vertical component gyroscopic computing device; Fig. 3 is a schematic view illustrating the lateral component gyroscopic computing device; Fig. 4 is a diagrammatic view illustrating the sighting station of Fig. 1 and its relation to a remotely positioned gun which is controlled from the sighting station, and to certain computing means which is arranged in accordance with this invention; Fig. 5 is a perspective view illustrating in detail the vertical component computing gyroscopic device, parts being broken away and parts shown in section so as to illustrate certain details of construction; Fig. 6 is a vertical sectional view taken through a part of the gyroscopic apparatus shown in Fig. 5; and Fig. 7 is a diagrammatic view illustrating certain elements of this computing system, and certain control means therefor.

Referring to the drawings, this invention has been shown in one form as applied to the control of a gun located on an aircraft, more particularly to the control of such a gun mounted in a turret which is remotely located with reference to the sighting station. As shown in Fig. 4, there is a sighting station 1, a remotely located gun station 2, and interposed between the two a computing station 3 in which certain elements of the lead computer arranged in accordance with this invention are located.

The sighting station, which is shown more specifically in Fig. 1, comprises a sighting device for establishing a line of sight 5. The sighting device may be of any suitable construction, but we prefer to use the sighting device described and claimed in the copending application of Dan L. Colbath, Serial No. 514,591, filed December 17, 1943, now Patent Number 2,406,807, and which is assigned to the assignee of this application. It will be understood that the observer whose eye is indicated by the numeral 6 will view the target through the sighting mechanism along the line of sight 5. The sighting device is mounted in a turret ring 7 for movement in a fixed ring member 8 so that the line of sight may be moved in traverse about a traverse axis $a$—$a$. The sighting mechanism is mounted directly upon a support 9 which is mounted upon a pair of shafts 10 so that it may be moved on an elevation axis $e$—$e$. The shafts 10 are journaled in standards 11 which are attached to the traverse ring 7.

Also mounted upon the support 9 are a pair of gyroscopic control devices 12 and 13, the element 12 being the vertical deflection gyroscope, and the element 13 being the lateral deflection gyroscope. It is the function of the gyroscopes 12 and 13 to measure the elevation and traverse components of angular velocity, respectively, of the line of sight.

The gyroscopes 12 and 13 are mounted upon the support 9 so that when they are in zero or null positions their spin axes will be parallel to the line of sight 5.

The arrangement of the gyroscope supporting means of this invention is such that when the angular velocity of the sighting mechanism is changed, either in elevation or traverse, and either when starting up initially from a stationary position corresponding to zero speed or thereafter when the sighting mechanism is being moved, the spin axis of the elevation or traverse gyroscope or the spin axes of both will not remain parallel to the line of sight 5; this is because the supporting means will apply a precessing torque or torques to cause one or the other or both of the gyroscopes to precess in a plane at right angles to the plane of the applied torque, that is at right angles to the elevation or traverse components respectively being measured. Referring more particularly to Fig. 2 wherein the elevation gyroscope 12 is shown diagrammatically, and also to Fig. 5 wherein this gyroscope is shown in detail, there is a gyroscope motor housing 14 in which an electric motor (not shown) is housed, and which motor drives a gyroscope wheel 15. Any suitable motor may be used, but in the embodiment illustrated, a direct current motor is used. The gyroscope is mounted by means of shafts 16 in bearings 17 which are attached to a fixed frame 18 located in the gyroscope outer housing 19, as shown more clearly in Fig. 5, and therefore to the sighting device 4. Because of this arrangement of the gyroscope, when the sight is rotated about axis $e$—$e$ and the housing 19 and frame 18 carried with it, a precessing torque will be applied through the supports 17 to the gyroscope shafts 16 and therefore will cause the gyroscope to precess on an axis through the shafts 16, in other words, in a direction at right angles to the direction of the applied torque.

The traverse gyroscope 13 is quite similar to the elevation gyroscope 12, but it is mounted upon shafts 20 journaled in the fixed frame pieces 21, corresponding to the parts 17 of the elevation gyroscope, and which shafts 20 are located at right angles to the shafts 16. And here, when the sight 4 is moved in traverse the frame 21 applies a torque to the gyroscope 13 to cause it to precess about the shafts 20.

Thus, whenever there is a change in the angular velocity of the line of sight 5, either when the sight is moved from a starting position, or when it is being moved to track a target, one or the other or both of the gyroscopes 12, 13 will precess and thereby move its spin axis out of parallelism with the line of sight.

Suitable means are provided for detecting this departure of the spin axes from their parallel relation with the line of sight. In the case of the elevation gyroscope 12, this means comprises a switch 22 which has a pair of spaced contacts 23 and 24 mounted upon the gyroscope to move with it as it precesses on the shafts 16, and a pair of respective cooperating "fixed" contacts 25 and 26 which are mounted on the frame 18. These contacts 25 and 26 are relatively elongated, are elastic, and are mounted upon electrically insulating supporting members 27 which, as shown more clearly in Fig. 5, are attached to the frame 18. Thus, when the gyroscope 12 precesses on shafts 16 in either direction one set or the other of the contacts 23 and 25, or 24 and 26 will close; the closure of these contacts is an indication that the spin axis has departed from parallelism with the line of sight 5.

The switch 2 not only functions to indicate the departure of the gyroscope from parallelism with the line of sight 5, but the spring contacts 25 and 26 operate as a stop for the gyroscope, and thereby as torque applying means for it. Thus, when the gyroscope 12 precesses from its null position one or the other of the spring contacts 25 or 26, depending upon the direction of movement of the sight in the vertical plane, stops the precession of the gyroscope, is deflected and flexed, and thereby applies to the gyroscope a torque. This torque, of course, is applied in a plane which is perpendicular to the axis of shafts 16, and thereby will cause a precession of the gyroscope in a vertical plane and at a rate proportional to the torque applied. As this torque is proportional to the angular velocity of the sight in the vertical plane it causes such a vertical precession of the gyroscope that it moves with the sight.

In a similar way, a switch 28 is provided for the traverse component gyroscope 13 to indicate its departure from the parallel position with relation to the line of sight 5. This switch is oriented 90° from the elevation switch 23, as shown. It comprises a pair of contacts 29 and 30 movable with the gyroscope and which cooperate with the flexible "fixed" contacts 31 and 32 respectively mounted upon insulating supports 33 which are fixed to a frame corresponding to the frame 18. When the sight 4 moves in traverse, a torque is applied to the gyroscope 13 through the supports 21 and the shafts 20 to cause it to precess about these shafts. This precession of the gyroscope will close one or the other of the switch contact sets 29 and 31, or 30 and 32 and thereby give an indication of the departure of the spin axis from parallelism with the line of sight 5. This switch also functions to apply a precessing torque to the gyroscope to precess it in traverse to cause it to move with the line of sight as it moves in traverse.

Coupling means are provided between the gyroscopes 12 and 13 and their supporting structure which operate responsively to the operation of the switches 22 and 28 respectively for applying to the two gyroscopes restoring torques counteracting the torques applied by the switches 24 and 28. This coupling means applies torques to the gyroscopes in the same directions as applied by the spring contacts 25 or 26, and 31 or 32; relieves the pressures applied by the spring contacts and thereby restores the gyroscopes to their null positions; and takes over from the contacts the work of precessing the gyroscopes to cause them to move with the line of sight 5.

In the case of the elevation gyroscope 12, shown in Figs. 2 and 5, the coupling means comprises a coupling element consisting of an electrical coil 34 which is attached to the end of the gyroscope motor frame 14 that is opposite the flywheel 15; as shown more clearly in Fig. 5, the turns of the coil 34 are wound to form a flat coil. This coil is mounted between supporting plates 35 which are clamped by screw fastening means 36 to this end of the motor housing 14. Interposed between the coil and the clamps are electrically insulating sheets 37. The flat coil 34 is located in a plane positioned at 90° to the axis of precession of the gyroscope on the axis of the shafts 16. Attached to the gyroscope housing 14 are a pair of substantially semi-circular permanent magnets 38 positioned so that their two poles are on opposite sides of the sheets 37, as shown, and which constitute the second element of the coupling means. These permanent magnets 38 are so arranged that the poles of opposite polarity of the two magnets are opposite each other. Therefore, it will be observed that a circular flux path is generated by these magnets, the flux of which links the turns of the coil. Surrounding the two magnets is a nonmagnetic ring 39 formed of brass or aluminum, and which is rigidly attached to the frame 18. The magnets, as shown, are secured to this ring by means of screw fastening means 40.

It will be understood that when a current is flowing in the coil 34 there will be a reaction between this current and the flux of the magnetic field, and as a result thereof a force on the conductors in the coil and consequent torque will be applied to the gyroscope to cause it to precess, which torque will be proportional to the magnitude of the current. The system is so controlled that when there is a departure of the gyroscope's spin axis from its position parallel with the line of sight 5, the current supplied to the coil 34 has such a direction through the coil 34 that the coupling will exert a torque on the gyroscope, which is the same in direction as the torque applied by the spring contact 25 or 26 of the switch 22; that is, it applies a torque in such a direction as to cause a precession in elevation of the gyroscope. In other words, since the force applied by the magnetic coupling means is in the same direction as that applied by the spring contact 25 or 26, it relieves the spring pressure, that is, assumes the work of precessing the gyroscope. Eventually the current supplied to the coil 34 will increase to such a magnitude that it will supply all of the torque required to precess the gyroscope in elevation to cause it to follow the line of sight, the torque supplied by the spring contacts decreasing correspondingly as the torque supplied by the coupling increases. When the coupling fully counterbalances the spring pressure it will restore the gyroscope to its null position. The control is further so arranged that thereafter the current supplied to the coil 34 tends to remain constant. The current required to open switch 22 is proportional to the magnitude of the angular velocity of the line of sight and is a measure thereof.

The restoring coupling means of the traverse gyroscope 13 shown in Fig. 3 is identically the same as that of the elevation gyroscope 12, except that the flat restoring coil 41 is positioned at right angles to the position of the coil 34, as clearly shown in Fig. 3; that is, the coil 41 lies in a plane which is perpendicular to the axis of the shafts 20. Here also, the permanent magnets 42 for generating the flux field linking the coil 41 are positioned at right angles to the corresponding magnets 38 of the elevation gyroscope. And the coupling means operates as does the other; that is, it counterbalances the torque applied by the switch 28, and the current of coil 41 required to do this is a measure of the traverse component of the line of sight's angular velocity.

The current supplied to the elevation coil 34 is controlled by means of a potentiometer 43 (Fig. 7) which is driven by means of a follow-up motor 44. While the system shown in Fig. 7 is for the elevation component of angular velocity only, it will be understood that an identical system (not shown) will be used for the traverse component of angular velocity.

The elevation coil 34, indicated diagrammatically in Fig. 7, is energized from a constant potential direct current source of electrical supply having negative and positive supply conductors 45 and 45a. It is to be noted here that the gyroscope motor 14 also is energized from this constant potential source of supply; it is governed by means of a governor (not shown) which maintains a constant angular velocity. Preferably and as shown, a double resistance potentiometer will be used, the potentiometer being provided with a pair of resistances 46 and 47 having their terminals connected to the two conductors 45 and 45a respectively. The midpoints of these resistances may be electrically interconnected by a permanent connection 48, although this is not necessary to their operation. And the potentiometer is provided with a pair of sliding contacts 49 and 50 for the two resistances 46 and 47 respectively. It will be understood that when the two contacts are opposite each other in their midpositions no voltage will be applied to the coil 34. If they be moved in opposite directions in one sense from their midpositions a voltage of one polarity will be applied to the coil 34, and if they be moved in opposite directions in the reverse sense from their midpositions a voltage of opposite polarity will be applied to the coil. Furthermore, it will be understood that in either case the magnitude of the voltage and hence of the current supplied to the coil will depend upon the extent of movement of the two contacts from their midpositions. By displacing the contacts 49 and 50 in the proper direction, and by the proper amount, it is possible to cause sufficient current to flow in the proper direction through the restoring coil 38 to counter-balance the effect of the precessing torque applied to the elevation gyroscope 12 by its switch 22.

The follow-up motor 44 is utilized to drive the sliding contacts 49 and 50 simultaneously. Any suitable connection means may be used between the motor 44 and the sliding contacts. Such means are diagrammatically illustrated in Fig. 7 as consisting of the motor shaft 51, and a nut 52 mounted on a threaded section of the shaft so as to be driven and moved along thereby, and which is connected to drive the sliding contact 49; the sliding contact 50 is driven by means of a nut 53 mounted upon a threaded section on a shaft 54, which shaft is driven by means of a shaft 55 which in turn is driven from the shaft 51. It will be understood that when the motor 44 operates it will rotate the shafts 51 and 54 simultaneously and at the same speed, and that it will move the two nuts 52 and 53 in opposite directions to move the contacts 49 and 50 in opposite directions and at the same speed.

Controlling the energization of the follow-up motor 44 to rotate in one direction or the other are a pair of reversing relays 56 and 57. The energizing coils 58 and 59 respectively of these relays are controlled by the switch contacts 23 and 25 and 24 and 26 respectively of gyroscope 12. When the switch contacts 23 and 25, for example, are closed by the precession of this gyroscope from its null position due to a change in one sense (increasing or decreasing) of the angular velocity of the line of sight 5, an energizing circuit will be completed for the coil 58, and as a result thereof the relay 56 will operate to open its contacts 60 and to close its two sets of contacts 61 and 62. When this occurs an energizing circuit for the motor 44 is completed, which circuit may be traced from the positive conductor 45a, through the conductor 63, the conductor 64, through closed contacts 62, and thence through the motor 44 and the closed contacts 61 to the "ground" side of the line, that is, the negative side of the supply source. The motor 44 will then operate in the proper direction to drive the two sliding contacts 49 and 50 away from their neutral or central positions to thereby cause current to flow to the restoring coil 34 in the proper direction to apply the restoring precessing torque to the gyroscope 12. The motor 44 will continue to operate in this fashion until the restoring current is sufficiently great to counteract the torque of switch contact 25, and thereby return the gyroscope to its null position wherein its spin axis is again parallel to the line of sight; and when this happens the switch contacts 23 and 25 will open to deenergize the controlling relay 56. When it is deenergized the contacts 61 and 62 open to deenergize the motor 44 and the contacts 60 reclose. It will be observed that when these contacts 60 reclose the armature of the motor 44 will be short circuited, and as a result thereof a dynamic braking action is effected which more quickly brings the motor 44 to a stop. Once all of this has taken place, the sliding contacts 49 and 50 remain stationary and the current fed to the coil 34 remains constant at the value necessary to cause precession of the gyroscope in elevation at the same rate that the line of sight is moved in elevation.

In a similar way the motor 44 is controlled to operate in the reverse direction to operate the sliding contacts 49 and 50 in the reverse sense when the gyroscope 14 precesses in elevation in the reverse direction away from the null position and closes the contacts 24 and 26, and in precisely the same way the restoring current is measured.

As previously explained, the amount of the restoring current flowing in the coil 34 necessary to cause the gyroscope 12 to return to its null position parallel with the line of sight 5 is a measure of the angular velocity of the line of sight, and hence is a measure of the speed of the target. It will be remembered that the sliding contacts 49 and 50 will change the voltage applied to the coil 34 as long as the motor 44 continues to operate. This voltage is an actual measure of the lead angle of the target, provided that the resistance of the circuit of the restoring coil 34 is adjusted in accordance with the time of flight of a projectile fired at the target. An auxiliary resistance network illustrated as a single resistance element 65 is inserted in series with the coil 34 so that the combined resistance of the resistance 65 and of the coil 34 will introduce a correction for the time of flight of the projectile. As shown, one terminal of this resistance 65 is connected to the sliding contact 50, whereas a sliding contact 66 of this resistance constituting its other terminal is connected to one terminal of the coil 34. This sliding contact 50 is adjusted by means of automatic computing means illustrated diagrammatically as a handwheel 67, and which is operated in accordance with time of flight. In other words, the current flowing in the coil 34, which is required to restore the gyroscope to its full position, multiplied by the resistance set by handwheel 67 is a measure of lead angle; this, of course, is the voltage applied by the potentiometer 43. Therefore, the extent to which these contacts are moved or, in other words, the number of revolutions of the follow-up motor 44 are a direct measure of the required lead angle. It is to be noted that an adjustment of the handwheel 67 changes resistance 65, and thereby changes the current following in the precessing coil 34. This causes the switch 22 to close, thereby energizing the motor 44. This motor thereupon changes the position of contacts 49 and 50 on the potentiometer resistors 46 and 47. This change continues until the resulting voltage change is sufficient to restore the original magnitude of the current through the coil 34 and thereby reopen the switch 22.

The potentiometer 43, the follow-up motor 44 and the time of flight resistance 65, as well as the motor contactors 56 and 57, are located in the computing station 3 which is remotely situated with reference to the sighting station, and the gun turret 2.

The operation of the traverse system is precisely the same as that of the elevation system just described and therefore, it has not been shown in greater detail. It is preferable, however, that the same handwheel 67 be used to drive the time of flight resistance of this system as well as the time of flight resistance 65 of the elevation system.

In operation, it will be understood that when the sight 4 changes its angular velocity the two gyroscopes 12 and 13 will control their respective switches 22 and 28 which in turn will control the directional contactors of the respective servo-motors provided for the two systems. It will be further understood that these servo-motors will control their potentiometers to apply the correct voltages to the restoring coils 34 and 41 respectively to restore the two gyroscopes to their null positions either when they are moved therefrom due to changes in the elevation and transverse angular velocity components of the line of sight 5, or to changes in the time of flight resistances 65 responsive to motion of handwheel 67. It will be further understood that the current flowing in the coil 34 will be a measure of the elevation component of angular velocity of the target, whereas the current flowing in the coil 41 will be a measure of the target's traverse component of the angular velocity. It will also be understood that when the handwheel 67 is set to the time of flight the voltages supplied by the potentiometers respectively will be used to measure the elevation and traverse components of lead angle.

What we claim as new and desire to secure by Letters Patent of the United States is:

1. A device for measuring angular velocity comprising a gyroscope, a support for said gyroscope mounting it for precession with reference to the support about a first axis, means mounting said support for movement about a second axis which is at right angles to said first axis, said support when moving about said second axis applying to said gyroscope a precessing torque to precess it about said first axis from a null position, first means operated responsively to the precession of said gyroscope from said null position for applying to said gyroscope a torque to precess it to cause it to move with said support as the latter moves about said second axis, second torque applying means operated responsively to the operation of said first torque applying means for applying a torque in the same direction as that applied by said first torque applying means and the magnitude of which changes until it equals that applied by said first torque applying means, the two torque applying means being operably associated with each other so that as the torque applied by said second means changes in one sense that of said first changes correspondingly in the opposite sense until said second means takes over the entire work of precessing said gyroscope, whereupon said gyroscope is precessed back to its null position, and said gyroscope controlling said second torque applying means responds to its precession back to said null position to thereafter hold its torque constant until a subsequent change in the velocity of said support occurs, and means for measuring the magnitude of the torque applied by said second torque applying means.

2. A device for measuring angular velocity comprising a gyroscope, a support for said gyroscope mounting it for precession with reference to the support about a first axis, means mounting said support for movement about a second axis which is at right angles to said first axis, said support when moving about said second axis applying to said gyroscope a precessing torque to precess it about said first axis from a null position, stop means for limiting the precession of said gyroscope about said first axis from said null position and applying to it a precessing torque to cause it to precess to move with said support as it moves on said second axis, the magnitude of said last-named torque depending upon the magnitude of the angular velocity of said support, current responsive coupling means between said gyroscope and support for applying to said gyroscope a restoring torque relieving the pressure applied by said stop means, control means operated responsively to the precession of said gyroscope from said null position controlling the restoring current supplied to said coupling means to apply a restoring torque to said gyroscope of sufficient magnitude to counterbalance said last-named precessing torque to thereby precess the gyroscope to return it to the null position, said control means being controlled responsively to the precession of said gyroscope back to said null position thereafter to hold said current substantially constant until a subsequent change in the angular velocity of said support occurs, and means for measuring said restoring torque.

3. A lead computer comprising directional means for establishing a direction line to a target, support means mounting said directional means for angular movement about a first axis to track a target, a gyroscope, means mounting said gyroscope on said support so that when the gyroscope is in a null position its spin axis is positioned in a predetermined relation to said direction line, and said mounting means on said support for said gyroscope providing for precession of said gyroscope on a precession axis at right angles to said first axis and applying a precessing torque to said gyroscope to precess it on said precession axis away from said null position when the angular velocity of said support means about said first axis varies, a coupling between said gyroscope and said support means for applying to said gyroscope a restoring torque to precess it to return to said null position, said coupling means having a magnet on one of said gyroscope or support means and a current carrying coil on the other positioned so that it lies in the flux field of said magnet, control means operated responsively to the precession of said gyroscope on said precession axis from said null position to control the supply of current to said coil in such direction and magnitude as to apply a restoring torque to said gyroscope to counteract the precessing torque which moved said gyroscope from said null position and to precess it back to said null position, and means for measuring the magnitude and direction of said restoring current.

4. A lead computer comprising directional means for establishing a direction line to a target, support means mounting said directional means for angular movement about a first axis to track a target, a gyroscope, means mounting said gyroscope on said support means so that when the gyroscope is in a null position its spin axis is positioned in parallel relation to said direction line, and said mounting means providing for precession of said gyroscope on a precession axis at right angles to said first axis and applying a precessing torque to said gyroscope to precess it away from said null position when the angular velocity of said support means about said first axis varies, stop means for stopping the precession of said gyroscope about said axis and for applying to it a torque to cause it to precess and move with said support as the latter moves about said first axis, a coupling between said gyroscope and said support means for applying to said gyroscope a restoring torque to precess it back to said null position, said coupling means having a flat coil mounted on said gyroscope so that its plane lies in the plane of precession of the gyroscope and magnetic means fixed to said support for generating magnetic flux linking said coil, control means operated responsively to the precession of said gyroscope on said precession axis from said null position controlling the supply of current to said coil in such direction and magnitude as to apply a force on the conductors in the coil and consequently a restoring torque which counteracts the precessing torque applied to said gyroscope by said stop and thereby move said gyroscope from said stop means to reduce the torque applied thereby to zero and move said gyroscope back to said null position, the coupling means then assuming the entire work of precessing said gyroscope to cause it to move with said support means, and means for measuring the magnitude and direction of said restoring torque.

5. A lead computer comprising directional means for establishing a direction line to a target, a support mounting said directional means for angular movement about a first axis to track a target, a gyroscope, means mounting said gyroscope on said support so that when the gyroscope is in a null position its spin axis is positioned in parallel relation to said direction line, and said mounting means providing for precession of said gyroscope on a precession axis at right angles to said first axis and applying a precessing torque to said gyroscope to precess it about said precession axis away from said null position when the angular velocity of said support about said first axis varies, a coupling between said gyroscope and said support for applying to said gyroscope a restoring torque to precess it back toward said null position, said coupling means having a flat coil mounted on said gyroscope so that its plane lies in the plane of precession of the gyroscope about said precession axis, and magnetic means fixed to said support for generating magnetic flux linking said coil, motor driven means for controlling the magnitude and direction of the current supplied to said coil, the direction of rotation of said motor and the magnitude thereof depending upon the revolutions of said motor, and switch means controlled by said gyroscope when it precesses from said null position for controlling the energization of said motor and its direction of rotation, the direction depending upon the direction of precession of said gyroscope from said null position, said motor when energized continuing to rotate to vary the current to said coil until said restoring torque generated in said coupling counteracts the precessing torque which precessed said gyroscope from said null position and thereby restores said gyroscope to said null position.

6. A lead computer comprising directional means for establishing a direction line to a target, a support mounting said directional means for angular movement about a first axis to track a target, a gyroscope, means mounting said gyroscope on said support so that when the gyroscope is in a null position its spin axis is positioned in parallel relation to said direction line, and said mounting means providing for precession of said gyroscope on a precession axis at right angles to said first axis and applying a precessing torque to said gyroscope to precess it on said precession axis away from said null position when the angular velocity of said support about said first axis varies, a coupling between said gyroscope and said support for applying to said gyroscope a restoring torque to precess it back toward said null position, said coupling means having a flat coil mounted on said gyroscope so that its plane is in the plane of precession of the gyroscope about said precession axis and magnetic means fixed to said support for generating magnetic flux linking said coil, a potentiometer for controlling the direction and magnitude of the current supplied to said coil, a motor for driving said potentiometer, a pair of reversing switches controlled by the precession of said gyroscope from said null position for controlling the energization of said motor and its direction of rotation, the direction of rotation of said motor depending upon the direction of precession of said gyroscope from said null position, said motor when energized operating said potentiometer to vary the current in said coil until said restoring torque generated in said coupling restores said gyroscope to said null position.

7. A lead computer comprising directional means for establishing a direction line to a target, support mounting said directional means for angular movement about a first axis to track a target, a gyroscope, means mounting said gyroscope on said support so that when the gyroscope is in a null position its spin axis is positioned in a predetermined relation to said direction line, and said mounting means providing for precession of said gyroscope on a precession axis at right angles to said first axis and applying a precessing torque to said gyroscope to precess it on said precession axis away from said null position when the angular velocity of said support about said first axis varies, a coupling between said gyroscope and said support for applying to said gyroscope a restoring torque to precess it toward said null position, said coupling means having a magnet on one of said gyroscope or support means and a current carrying coil on the other positioned so that it lies in the flux field of said magnet, control means operated responsively to the precession of said gyroscope on said predetermined axis from said null position to control the supply of current to said coil in such direction and magnitude as to apply a restoring torque to said gyroscope to precess it back to said null position, and an adjustable resistance element connected in the circuit of said coil for controlling the resistance of said circuit in accordance with the time of flight of a projectile to said target.

8. A lead computer comprising directional means for establishing a direction line to a target, a support mounting said directional means for angular movement about a first axis to track a target, a gyroscope, means mounting said gyroscope on said support so that when the gyroscope is in a null position its spin axis is positioned in a predetermined relation to said direction line, and said mounting means on said support for said gyroscope providing for precession of said gyroscope on a precession axis at right angles to said first axis and applying a precessing torque to said gyroscope to precess it on said precession axis away from said null position when the angular velocity of said support about said first axis varies, current responsive coupling means between said gyroscope and said support for applying to said gyroscope or restoring precessing torque to return it to said null position, a constant voltage electrical supply source for said coupling means, an energizing circuit for said coupling means connected to said supply source, control means for said circuit for controlling the voltage applied from said source to said coupling means operated responsively to the precession of said gyroscope from said null position to control said voltage so that current of sufficient magnitude and direction is applied to said coupling means so as to restore said gyroscope to said null position, and means for adjusting the resistance of said circuit in accordance with the time of flight of a projectile to said target so that the voltage applied to cause restoration of said gyroscope to the null position is a measure of the angular velocity of said direction line.

9. A lead computer comprising directional means for establishing a direction line to a target, a support mounting said directional means for angular movement about a first axis to track a target, a gyroscope, mounting means for mounting said gyroscope on said support so that when the gyroscope is in a null position its spin axis is positioned in a predetermined relation to said direction line, and said mounting means providing for precession of said gyroscope on a precession axis at right angles to said first axis and applying a precessing torque to said gyroscope to precess it on said precession axis away from said null position when the angular velocity of said support means about said first axis varies, current responsive coupling means between said gyroscope and said support for applying to said gyroscope a restoring precessing torque for returning it to said null position, a constant voltage direct current electrical supply source for said coupling means, an energizing circuit for said coupling means connected to said supply source, a potentiometer having a pair of resistances connected across said supply source and a pair of sliding contacts for said resistances, said contacts connected to said coupling means to supply voltage thereto, means operated responsively to the precession of said gyroscope from said null position for operating said contacts to cause a voltage to be applied to said coupling means in such direction and magnitude that the current flow thereto supplies a restoring torque to said gyroscope to restore it to said null position, and an adjustable resistance connected in said circuit between said potentiometer and said coupling means set in accordance with the time of flight of a projectile to said target.

10. In a device for measuring angular velocity, a support rotatable about a first axis, a gyroscope mounted on said support to permit precession about a second axis perpendicular to said first axis whereby rotation of said support about said first axis causes a precessional displacement of said gyroscope about said second axis relative to a null position, electromagnetic precessing means arranged to apply a torque to said gyroscope about said second axis, means for supplying electrical current to said precessing means, means including a reversible motor for adjustably varying the direction and magnitude of said current whereby a corresponding variation occurs in the direction of magnitude of the torque applied to said gyroscope by said precessing means, and switching mechanism actuated by displacement of said gyroscope about said second axis away from said null position in either direction for actuating said reversible motor in a direction dependent upon the direction of said displacement.

JOHN R. MOORE.
DAN L. COLBATH.

REFERENCES CITED

The following references are of record in the file of this patent:

UNITED STATES PATENTS

| Number | Name | Date |
| --- | --- | --- |
| 1,031,769 | Barr | July 9, 1912 |
| 1,390,471 | Sundhaussen | Sept. 3, 1921 |
| 1,936,442 | Willard | Nov. 21, 1933 |

Certificate of Correction

Patent No. 2,440,968. May 4, 1948.

JOHN R. MOORE ET AL.

It is hereby certified that errors appear in the printed specification of the above numbered patent requiring correction as follows: Column 3, lines 25 and 27, for "device" read *device 4*; column 4, line 54, for "switch 2" read *switch 22*; column 8, line 42, for "full" read *null*; line 51, for "following" read *flowing*; column 9, lines 10 and 11, for "transverse" read *traverse*; column 11, line 46, claim 5, after the word "of" first occurrence, insert *said current depending upon the direction of*; and that the said Letters Patent should be read with these corrections therein that the same may conform to the record of the case in the Patent Office.

Signed and sealed this 17th day of August, A. D. 1948.

[SEAL]

THOMAS F. MURPHY,
*Assistant Commissioner of Patents.*